(12) United States Patent
Yang et al.

(10) Patent No.: US 10,026,949 B2
(45) Date of Patent: Jul. 17, 2018

(54) SECONDARY BATTERY AND ELECTRODE LEAD ASSEMBLY APPLIED THERETO

(71) Applicant: LG Chem, Ltd., Seoul (KR)

(72) Inventors: Jung-Hoon Yang, Daejeon (KR); Young-Suk Cho, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 405 days.

(21) Appl. No.: 14/650,094

(22) PCT Filed: Sep. 24, 2014

(86) PCT No.: PCT/KR2014/008898
§ 371 (c)(1),
(2) Date: Jun. 5, 2015

(87) PCT Pub. No.: WO2015/046878
PCT Pub. Date: Apr. 2, 2015

(65) Prior Publication Data
US 2016/0028068 A1     Jan. 28, 2016

(30) Foreign Application Priority Data

Sep. 26, 2013 (KR) .................. 10-2013-0114675
Sep. 23, 2014 (KR) .................. 10-2014-0127020

(51) Int. Cl.
*H01M 2/34* (2006.01)
*H01M 2/26* (2006.01)
(Continued)

(52) U.S. Cl.
CPC .............. *H01M 2/34* (2013.01); *H01M 2/06* (2013.01); *H01M 2/08* (2013.01); *H01M 2/1235* (2013.01);
(Continued)

(58) Field of Classification Search
None
See application file for complete search history.

(56) References Cited

U.S. PATENT DOCUMENTS

2006/0170396 A1    8/2006  Ha et al.
2006/0238162 A1 * 10/2006  Cheon .................. H01M 2/021
                                                   320/112
(Continued)

FOREIGN PATENT DOCUMENTS

EP    2317589 A1 *  5/2011  .............. H01M 2/22
EP    2662913 A1 * 11/2013  .......... H01M 2/1016
(Continued)

OTHER PUBLICATIONS

International Search Report for Application No. PCT/KR2014/008898 dated Jan. 9, 2015.
(Continued)

*Primary Examiner* — Daniel S Gatewood
(74) *Attorney, Agent, or Firm* — Lerner, David, Littenberg, Krumholz & Mentlik, LLP

(57) ABSTRACT

A secondary battery according to the present disclosure includes an electrode assembly, a first lead plate connected to the electrode assembly, a second lead plate disposed facing the first lead plate with a gap therebetween such that at least a portion of the second lead plate overlaps with at least a portion of the first lead plate, a metal bridge disposed within the gap to connect the first lead plate and the second lead plate, a first sealant disposed within the gap further outside than the metal bridge, a pouch case to receive the electrode assembly such that the second lead plate is drawn outside, and a second sealant interposed respectively between an inner surface of the pouch case and the first lead plate and between the inner surface of the pouch case and the second lead plate.

17 Claims, 5 Drawing Sheets

(51) Int. Cl.
- *H01M 2/06* (2006.01)
- *H01M 2/08* (2006.01)
- *H01M 2/30* (2006.01)
- *H01M 10/04* (2006.01)
- *H01M 2/12* (2006.01)
- *H01M 2/02* (2006.01)

(52) U.S. Cl.
CPC .............. *H01M 2/26* (2013.01); *H01M 2/30* (2013.01); *H01M 10/04* (2013.01); *H01M 2/0275* (2013.01); *H01M 2/348* (2013.01); *H01M 2200/00* (2013.01); *H01M 2200/103* (2013.01)

(56) References Cited

U.S. PATENT DOCUMENTS

2013/0323549 A1   12/2013   Choi et al.
2013/0337300 A1*  12/2013   Saito ................... H01M 2/0212
                                                    429/61

FOREIGN PATENT DOCUMENTS

| | | | | |
|---|---|---|---|---|
| JP | 2008524798 A | 7/2008 | | |
| KR | 20060112035 A | 10/2006 | | |
| KR | 20080100980 A | 11/2008 | | |
| KR | 20130059301 A | 6/2013 | | |
| KR | 20130089375 A | 8/2013 | | |
| WO | 2012132719 A1 | 10/2012 | | |
| WO | WO 2012132719 A1 * | 10/2012 | .......... | H01M 2/0212 |
| WO | 2013081375 A1 | 6/2013 | | |

OTHER PUBLICATIONS

Extended Search Report from European Application No. 14848723.4, dated Aug. 31, 2016.

* cited by examiner

SECONDARY BATTERY AND ELECTRODE LEAD ASSEMBLY APPLIED THERETO

TECHNICAL FIELD

The present disclosure relates to a secondary battery and an electrode lead assembly applied thereto, and more particularly, to a secondary battery having a structure for quickly shutting off an overcurrent and easily discharging gas generated in the secondary battery, and an electrode lead assembly applied thereto.

The present application is a national phase entry under 35 U.S.C. § 371 of International Application No. PCT/KR2014/008898 filed Sep. 24, 2014, published in Korean, which claims priority to Korean Patent Application No. 10-2013-0114675 filed in the Republic of Korea on Sep. 26, 2013 and Korean Patent Application No. 10-2014-0127020 filed in the Republic of Korea on Sep. 23, 2014, the disclosures of which are incorporated herein by reference.

BACKGROUND ART

With the growing use of portable electric products such as video cameras, mobile phones, and portable computers, significance of secondary batteries being mainly used as a power source on which the portable electric products work are increasing.

Generally, as opposed to a disposable primary battery, a secondary battery is rechargeable and is being studied very actively with the development in high-tech fields, for example, digital cameras, cellular phones, laptop computer, power tools, electric bikes, electric vehicles, hybrid electric vehicles, high-capacity energy storage systems, and the like.

In particular, a lithium secondary battery has a high energy density per unit weight and allows quick charging, when compared to other conventional secondary batteries such as a lead storage battery, a nickel-cadmium battery, a nickel-hydrogen battery and a nickel-zinc battery, and thus, its use is on an upward trend.

A lithium secondary battery has an operating voltage higher than or equal to 3.6V, and is used as a power source of portable electronic appliances or high power devices such as electric vehicles, hybrid electric vehicles, power tools, electric bikes, energy storage systems, and uninterruptible power supplies (UPS) by connecting a plurality of batteries in series or in parallel.

A lithium secondary battery has three times higher operating voltage than that of a nickel-cadmium battery or a nickel-metal hydride battery and an excellent characteristic of energy density per unit weight, and thus, is being increasingly used.

A lithium secondary battery may be classified into a lithium ion battery using a liquid electrolyte and a lithium ion polymer battery using a solid polymer electrolyte, based on the type of an electrolyte. Also, a lithium ion polymer battery may be divided into an all-solid-state lithium ion polymer battery containing no electrolyte liquid and a lithium ion polymer battery using a gel polymer electrolyte containing an electrolyte liquid, based on the type of a solid polymer electrolyte.

A lithium ion battery using a liquid electrolyte is generally sealed hermetically by welding using a cylindrical or prismatic metal can as a container. A can-type secondary battery using a metal can as a container has a fixed shape, which has limitations on design of electric products using it as a power source as well as on volume reduction. Accordingly, a pouch-type secondary battery fabricated by putting an electrode assembly and an electrolyte into a pouch casing made from films and forming a seal has been developed and is being used.

However, a lithium secondary battery has a risk of explosion when overheated, so ensuring safety is one of the important challenges. Overheat occurs in a lithium secondary battery by various reasons, and one of them is a flow of overcurrent beyond the limit through a lithium secondary battery. When an overcurrent flows, a lithium secondary battery generates heat by Joule heating and the temperature inside the battery increases rapidly. Also, a rapid temperature rise brings about a decomposition reaction of an electrolyte solution, causing a thermal runaway phenomenon, and in the end, results in explosion of the battery. An overcurrent occurs due to dielectric breakdown between a cathode and an anode caused by penetration of a pointed metal object through a lithium secondary battery or shrinkage of a separator interposed between the cathode and the anode, or when a rush current is applied to the battery due to an abnormal condition of an external charging circuit or load being connected.

Accordingly, to protect a lithium secondary battery from an abnormal situation such as occurrence of an overcurrent, the battery is used in combination with a protection circuit, and generally the protection circuit includes a fuse device to irreversibly disconnect a line through which a charging or discharging current flows in the event of an overcurrent.

FIG. 1 is a circuit diagram illustrating a layout and an operating mechanism of a fuse device in the construction of a protection circuit connected with a battery pack including a lithium secondary battery.

As shown in the drawing, the protection circuit includes a fuse device 1 to protect the battery pack when an overcurrent occurs, a sense resistor 2 to sense an overcurrent, a microcontroller 3 to monitor the occurrence of an overcurrent and operate the fuse device 1 when an overcurrent occurs, and a switch 4 to perform a switching operation to cause an operating current to flow into the fuse device 1.

The fuse device 1 is installed on a main line connected to an outermost terminal of the battery pack. The main line refers to a wire through which a charging or discharging current flows. In the drawing, the fuse device 1 is illustrated as being installed on a high potential line (Pack+).

The fuse device 1 is a 3-terminal element; two terminals are connected to the main line through which a charging or discharging current flows and the rest is connected to the switch 4. Also, on the inside, the fuse device 1 includes a fuse 1a which is directly connected to the main line and melts at a particular temperature, and a resistor 1b which applies heat to the fuse 1a.

The microcontroller 3 monitors whether an overcurrent is occurring or not by periodically detecting the voltage across both ends of the sense resistor 2, and when an occurrence of an overcurrent is detected, turns on the switch 4. Then, the electric current flowing through the main line is bypassed to flow toward the fuse device 1 and applied to the resistor 1b. Thus, Joule heat generated from the resistor 1b is transmitted to the fuse 1a and increases the temperature of the fuse 1a, and when the temperature of the fuse 1a reaches a melting temperature, the fuse 1a melts and as a consequence, the main line is irreversibly disconnected. When the main line is broken, the overcurrent does not flow any longer and the problem caused by the overcurrent may be solved.

However, the related art described in the foregoing has many problems. That is, when a failure occurs in the microcontroller 3, the switch 4 does not turn on even in the situation where an overcurrent occurs. In this case, an electric current does not flow into the resistor 1*b* of the fuse device 1, and the fuse device 1 does not work. Also, a separate space for disposing the fuse device 1 within the protection circuit is needed, and a program algorithm for controlling the operation of the fuse device 1 needs to be loaded in the microcontroller 3. Therefore, there are drawbacks of reduced spatial efficiency of the protection circuit and increased load of the microcontroller 3.

DISCLOSURE

Technical Problem

The present disclosure is designed to solve the above problem, and therefore, the object of the present disclosure is to reduce a risk of fire/explosion caused by a short circuit or an overcurrent through a structure of a secondary battery itself.

However, the object of the present disclosure is not limited to the above object, and other objects of the present disclosure will become apparent to those skilled in the art from the following description.

Technical Solution

To achieve the above object, a secondary battery according to an exemplary embodiment of the present disclosure includes an electrode assembly, a first lead plate connected to the electrode assembly, a second lead plate disposed facing the first lead plate with a gap therebetween such that at least a portion of the second lead plate overlaps with at least a portion of the first lead plate, a metal bridge disposed within the gap to connect the first lead plate and the second lead plate, a first sealant disposed within the gap further outside than the metal bridge, a pouch case to receive the electrode assembly such that the second lead plate is drawn outside, and a second sealant interposed respectively between an inner surface of the pouch case and the first lead plate and between the inner surface of the pouch case and the second lead plate.

The metal bridge may be continuously formed along a widthwise direction of the first lead plate and the second lead plate.

The metal bridge may be discontinuously formed along a widthwise direction of the first lead plate and the second lead plate.

The metal bridge may be made of a metal having a lower melting point than the first lead plate and the second lead plate.

The metal bridge may have the melting point from 150° C. to 300° C.

The first sealant may be continuously formed along a widthwise direction of the first lead plate and the second lead plate to seal the pouch case.

The first sealant may have a narrower width than the second sealant.

The first sealant may have a venting notch formed in a direction facing the metal bridge from the electrode assembly.

The venting notch may have a gradual decrease in width along a direction facing the metal bridge.

The venting notch may have a wedge shape.

Also, the above object may be achieved by an electrode lead assembly according to an exemplary embodiment of the present disclosure employed in the secondary battery, and the electrode lead assembly according to an exemplary embodiment of the present disclosure includes a first lead plate, a second lead plate disposed facing the first lead plate with a gap therebetween such that at least a portion of the second lead plate overlaps with at least a portion of the first lead plate, a metal bridge disposed within the gap to connect the first lead plate and the second lead plate, a first sealant disposed within the gap further outside than the metal bridge, and a second sealant attached to an outer surface of the first lead plate and an outer surface of the second lead plate.

The metal bridge may be made of a metal having a lower melting point than the first lead plate and the second lead plate.

The metal bridge may have the melting point from 150° C. to 300° C.

The first sealant may be continuously formed along a widthwise direction of the first lead plate and the second lead plate.

The first sealant may have a narrower width than the second sealant.

The first sealant may have a venting notch formed in a direction facing the metal bridge from the first sealant.

The venting notch may have a gradual decrease in width along a direction facing the metal bridge.

The venting notch may have a wedge shape.

Advantageous Effects

According to one aspect of the present disclosure, safety of a secondary battery in use may be ensured by quickly shutting off an overcurrent flowing in the secondary battery.

According to another aspect of the present disclosure, safety of a secondary battery in use may be ensured by quickly discharging gas out of the secondary battery when the internal pressure is higher than or equal to a predetermined level due to gas generated in the secondary battery.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A secondary battery 100 according to an exemplary embodiment of the present disclosure is described with reference to FIG. 2.

Figure 1:
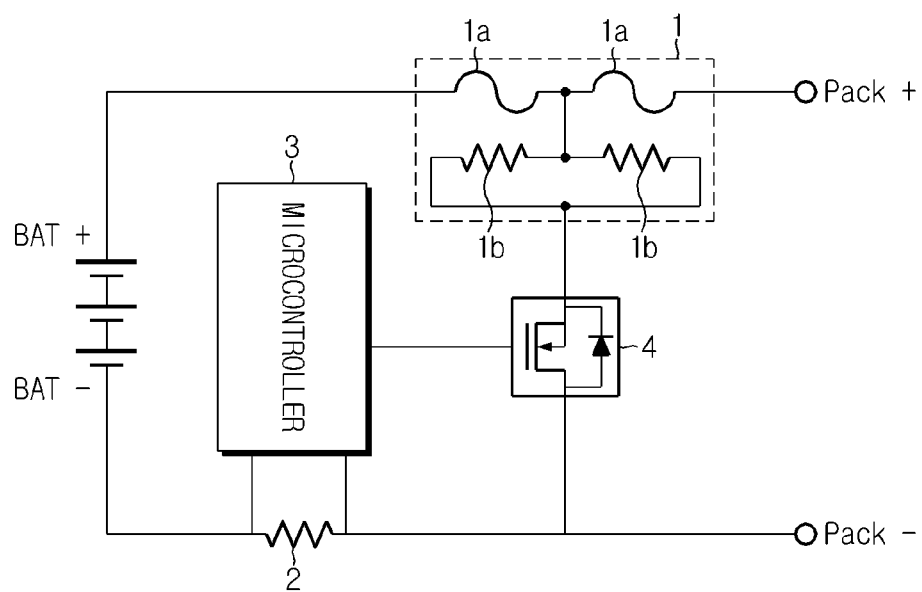
FIG. 1 is a circuit diagram illustrating a layout and an operating mechanism of a fuse device in the construction of a protection circuit connected with a battery module.
Figure 2:
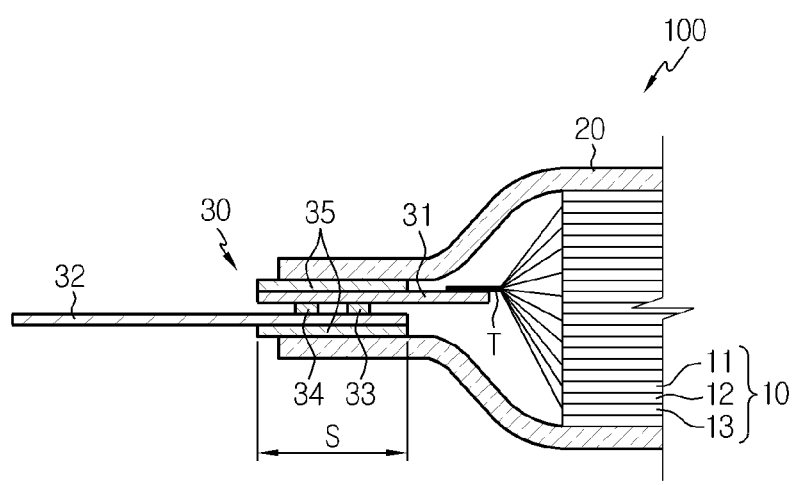
FIG. 2 is a cross-sectional view illustrating a secondary battery according to an exemplary embodiment of the present disclosure.

FIG. 2 is a cross-sectional view illustrating the secondary battery according to an exemplary embodiment of the present disclosure.

Referring to FIG. 2, the secondary battery 100 according to an exemplary embodiment of the present disclosure includes an electrode assembly 10, a pouch case 20, and an electrode lead assembly 30.

The electrode assembly 10 includes a cathode plate 11, an anode plate 12, a separator 13, and an electrode tab T. The electrode assembly 10 may be a stack-type electrode assembly including the cathode plate 11 and the anode plate 12 stacked on top of one another with the separator 13 interposed between the cathode plate 11 and the anode plate 12. Although the drawing of the present disclosure shows the electrode assembly 10 is of a stack-type, a jelly-roll type may be also contemplated.

The cathode plate 11 may be formed by coating a cathode active material on a current collector of aluminum (Al), and the anode plate 12 may be formed by coating an anode active material on a current collector of copper (Cu).

The electrode tab T is integrally formed with the electrode plate 11 and 12, and corresponds to a non-coating area where the electrode active material is not coated on the electrode plate 11 and 12. That is, the electrode tab T includes a cathode tab corresponding to an area where the cathode active material is not coated on the cathode plate 11 and an anode tab corresponding to an area where the anode active material is not coated on the anode plate 12.

The pouch case 20 includes an upper case 21 and a lower case 22, made of a multi-layer film. The multi-layer film may include, for example, an innermost layer of polypropylene (PP), an intermediate layer of aluminum (Al), and an outermost layer of polyethylene terephthalate (PET).

The pouch case 20 receives the electrode assembly 10 in an internal space, and is sealed by heat fusion such that circumferential areas of the upper/lower cases 21 and 22 face each other with the electrode lead assembly 30 drawn outside at one side.

Although not shown in the drawing, the sealed pouch case 20 is filled with an electrolyte solution to allow ions of the active material to move.

The electrode lead assembly 30 includes a first lead plate 31, a second lead plate 32, a metal bridge 33, a first sealant 34, and a second sealant 35.

A conductive assembly made up of the first lead plate 31, the second lead plate 32, and the metal bridge 33 may serve as a cathode lead and/or an anode lead of the secondary battery 100 according to an exemplary embodiment of the present disclosure. That is, the secondary battery 100 according to an exemplary embodiment of the present disclosure may have a structure in which a conductive assembly of a double structure is applied to at least one of the cathode lead and the anode lead.

The first lead plate 31 of a thin flat metal is attached to the electrode tab T and extends in an outward direction of the electrode assembly 10.

Also, the first lead plate 31 may differ in material based on the type of the electrode tab T to which the first lead plate 31 is connected. That is, when connected to the cathode tab, the first lead plate 31 may be made of aluminum, and when connected to the anode tab, the first lead plate 31 may be made of copper or copper coated with nickel (Ni).

The second lead plate 32 is disposed facing the first lead plate 31 with a gap therebetween such that at least a portion of the second lead plate 32 overlaps with at least a portion of the first lead plate 31, and may be made of the same material as the first lead plate 31. One end of the second lead plate 32 is drawn out of the pouch case 20 through the sealed area of the circumference of the pouch case 20.

The metal bridge 33 is disposed within the gap formed between the lead plates 31 and 32 to connect the lead plates 31 and 32.

In the conductive assembly made up of the lead plates 31 and 32 and the metal bridge 33, an area where the metal bridge 33 is formed corresponds to an area with higher resistance than a surrounding area, and when an overcurrent occurs due to, for example, a short circuit, a large amount of heat is produced in the area, and thus the area is susceptible to melting. That is, when an overcurrent occurs in the secondary battery 100, as the temperature increases due to the expansion pressure and/or relatively high resistance of cells, the metal bridge 33 melts quickly to shut off a flow of electric current between the lead plates 31 and 32.

Considering the metal bridge 33 may melt by the temperature increase due to the relatively high resistance, the metal bridge 33 may be made of a metal having a lower melting point than the lead plates 31 and 32, for example, from about 150° C. to about 300° C. Such a low melting point metal include, for example, a lead-free alloy containing tin (Sn) and copper (Cu) as a main substance, without lead (Pb) which does harm to the environment and human body.

The melting point range of the metal bridge 33 is set in consideration of a level of an overcurrent intended to interrupt. When the melting point of the metal bridge 33 is lower than 150° C., the metal bridge 33 may melt even when a normal electric current flows through the secondary battery 100. For example, in the case where the secondary battery 100 is used in an electric vehicle, when the melting point is lower than 150° C., the metal bridge 33 may melt by the fast charging/discharging current. Also, when the melting point of the metal bridge 33 is higher than 300° C., an overcurrent is not shut off quickly and thus, the use of the electrode lead assembly 30 is substantially ineffective.

Among the constituent materials of the metal bridge 33, tin affects the melting point and tensile strength characteristics of the metal bridge 33. The content of tin is adjusted to approximately 80 wt % or higher, preferably, in a range of 85 wt % to 98 wt %, for good tensile strength characteristics of the metal bridge 33 and the melting point in the range of about 150° C. to about 300° C. Copper functions to improve the electrical conductivity of the components, and in consideration of this function, the content of copper is adjusted within a range of approximately 2 wt % to 20 wt %, preferably, a range of approximately 4 wt % to 15 wt %. Here, wt % is a unit based on a total weight of the constituent materials of the metal bridge 33 (hereinafter equally applied).

As described above, by adjusting the content of tin and copper to have a proper range, not only the tensile strength of the metal bridge 33 may be enhanced, but also an increase in resistance by the metal bridge 33 may be controlled within several %.

For improved properties, in addition to tin and copper, the metal bridge 33 may further include, as an additional alloy substance, a metal having high electrical conductivity such as nickel (Ni), silver (Ag), and zinc (Zn). The content of the additional alloy substance is preferably in a range of approximately 0.01 wt % to 10 wt % based on the total weight of the materials.

Thus, making the metal bridge 33 from an alloy with a lower melting point than the lead plates 31 and 32 is favorable in terms of quick melting, but the material of the metal bridge 33 is not limited thereto. That is, even if the metal bridge 33 is made of the same material as the lead plates 31 and 32, because the area where the metal bridge 33 is formed has a larger amount of heat generated than the surrounding area, when an overcurrent occurs, the metal bridge 33 may melt and thus perform an overcurrent shut-off function.

A specific shape and a formation location of the metal bridge 33 is described in detail with reference to FIGS. 3 through 6 as below.

The first sealant 34 is disposed within the gap formed between the lead plates 31 and 32, and allows the pouch case 20 to be sealed together with the second sealant 35. The first sealant 34 is made of a film with insulating and heat fusible properties. This film may include, for example, at least one material layer (single membrane or multiple membranes) selected from polyimide (PI), polyprophylene (PP), polyethylene (PE) and polyethylene terephthalate (PET).

When gas is generated in the secondary battery 100 and the expansion pressure excessively increases, the first sealant 34 may serve as a venting unit to discharge the gas.

Taking this role into account, it would be advantageous to dispose the first sealant 34 further outside in a direction facing away from the electrode assembly 10 than the metal bridge 33.

That is, if the metal bridge 33 is formed further inside than the first sealant 34, when a swelling phenomenon occurs due to an abnormal overcurrent, the electrical connection between the first lead plate 31 and the second lead plate 32 established by the metal bridge 33 is released first, and the overcurrent is thus shut off.

Also, even after the overcurrent is shut off, internal gas may be continuously generated by a side reaction of an electrolyte solution due to self-discharge of the secondary battery 100, and in this case, the pressure concentrates on the first sealant 34, causing venting, therefore, a risk of fire/explosion may be completely eliminated.

A specific shape and a formation location of the first sealant 34 is described in detail with reference to FIGS. 7 through 9 as below.

The second sealant 35 is attached to each of the lead plates 31 and 32 within an overlapping area S of the lead plates 31 and 32, and is disposed between the lead plates 31 and 32 and an inner surface of the pouch case 20, and may be made of the same material as the first sealant 34.

The second sealant 35 prevents a short circuit from occurring between the lead plates 31 and 32 and the metal layer of the pouch case 20, and is joined with the first sealant 34 by heat fusion to seal an area where the electrode lead assembly 30 is drawn.

Subsequently, various shapes of the metal bridge 33 applied to the secondary battery 100 according to an exemplary embodiment of the present disclosure are described with reference to FIGS. 3 through 6.

FIGS. 3 through 6 are plane views illustrating various shapes of the metal bridge applied to the secondary battery of FIG. 2.

Figure 3:
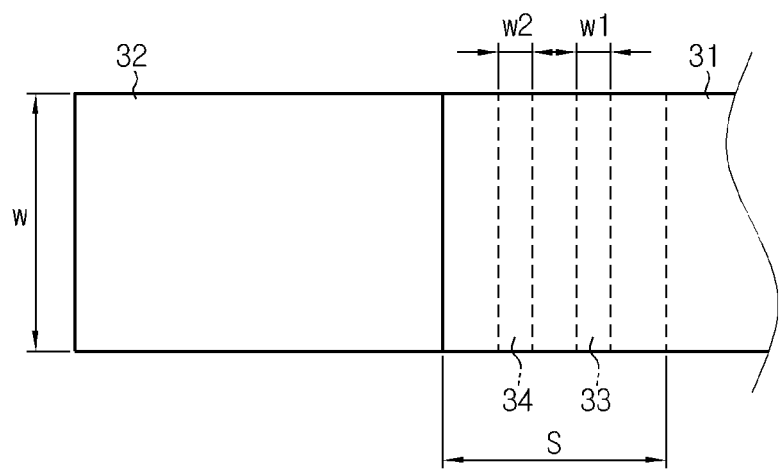
FIGS. 3 through 6 are plane views illustrating various shapes of a metal bridge applied to the secondary battery of FIG. 2.
Figure 4:
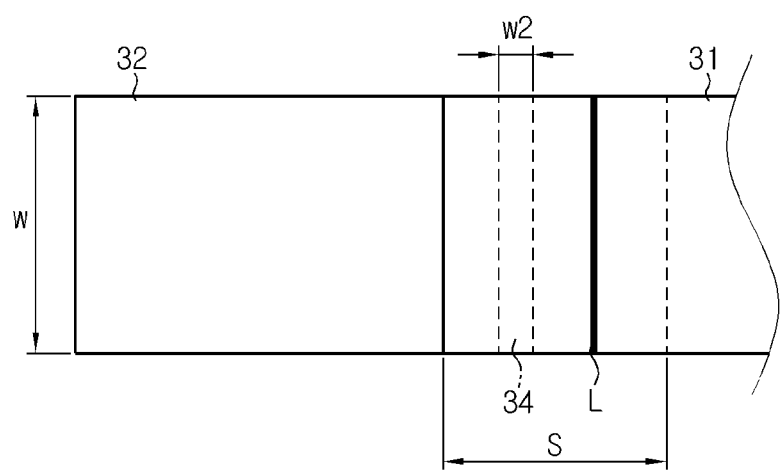

First, referring to FIGS. 3 and 4, the metal bridge 33 may be continuously formed in a widthwise direction W of the lead plates 31 and 32. Also, the metal bridge 33 may be formed by joining the above-described low melting point alloy or the same type of metal as the lead plates 31 and 32 between the lead plates 31 and 32 (see FIG. 3), or may be formed by performing line welding on both surfaces of the lead plates 31 and 32 (see FIG. 4). When the lead plates 31 and 32 are connected by line welding, a welding line L may be formed on the surfaces of the lead plates 31 and 32 as shown in FIG. 4.

Figure 5:
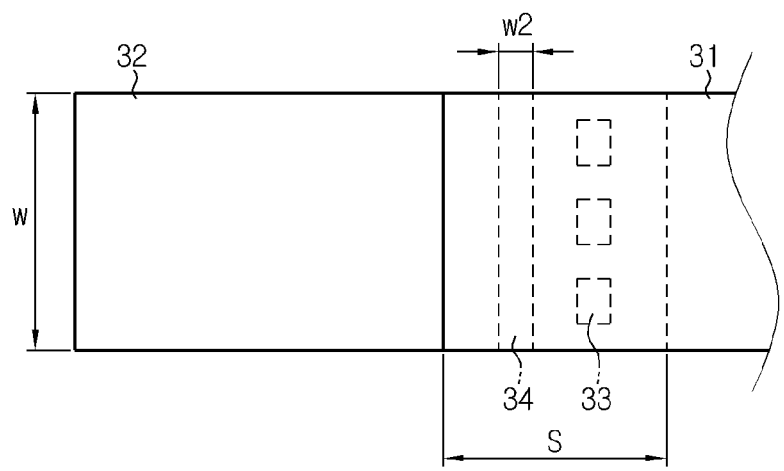
Figure 6:
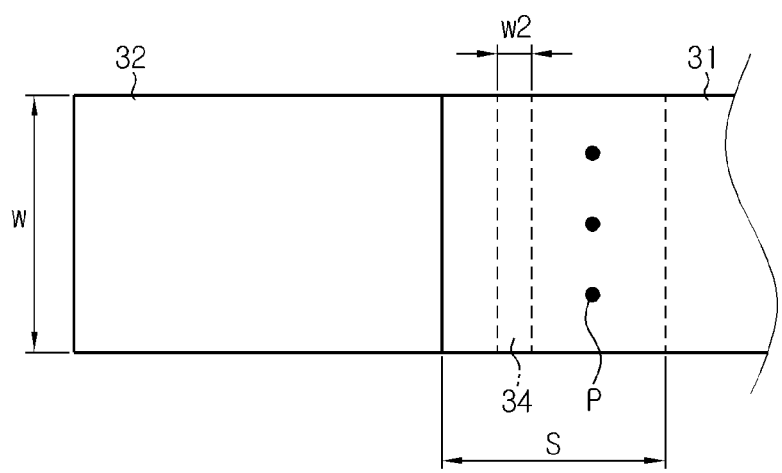

Subsequently, referring to FIGS. 5 and 6, the metal bridge 33 may be discontinuously formed in the widthwise direction W of the lead plates 31 and 32. Also, the metal bridge 33 may be formed by joining the above-described low melting point alloy or the same type of metal as the lead plates 31 and 32 between the lead plates 31 and 32 (see FIG. 5), or may be formed by performing spot welding on both surfaces of the lead plates 31 and 32 (see FIG. 6). When the lead plates 31 and 32 are connected by spot welding, a welding spot P may be formed on the surfaces of the lead plates 31 and 32 as shown in FIG. 6

In this instance, a width w1 of the metal bridge 33 needs to be determined to have a proper size in consideration of easy melting and conduction when an overcurrent occurs.

Subsequently, various shapes of the first sealant 34 applied to the secondary battery 100 according to an exemplary embodiment of the present disclosure are described with reference to FIGS. 7 through 9.

Figure 7:
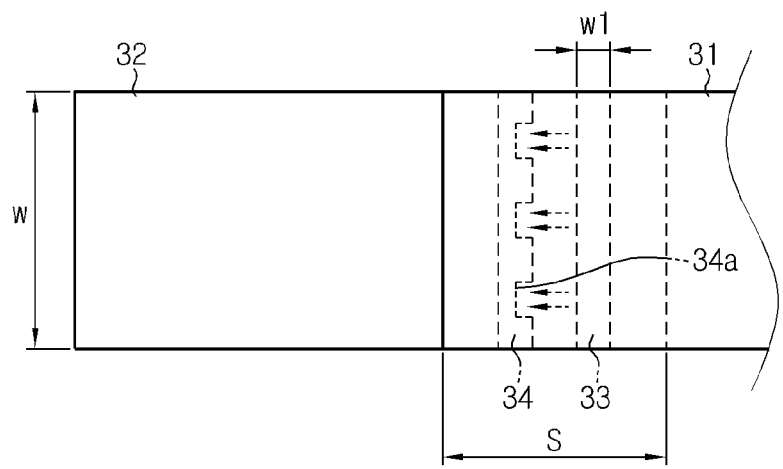
FIGS. 7 through 9 are plane views illustrating various shapes of a first sealant applied to the secondary battery of FIG. 2.
Figure 8:
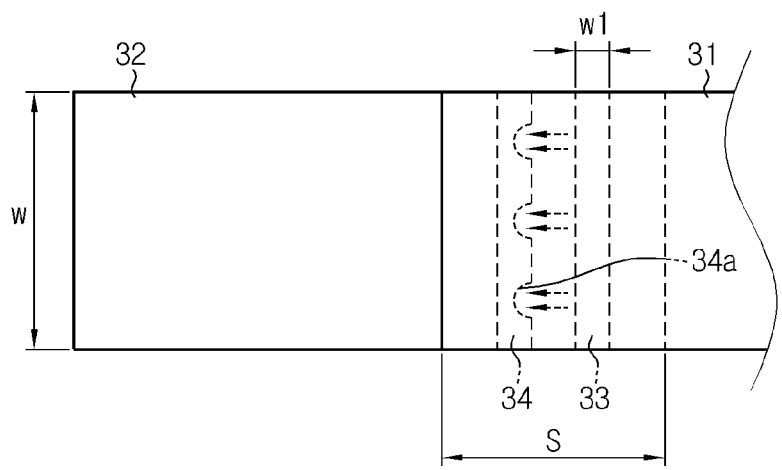
Figure 9:
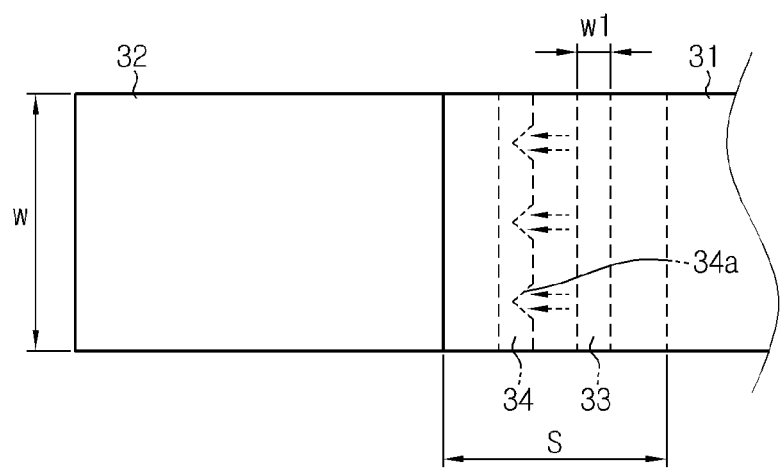

FIGS. 7 through 9 are plane views illustrating various shapes of the venting sealant applied to the secondary battery of FIG. 2.

Referring to FIGS. 7 through 9, the first sealant 34 is continuously formed along the widthwise direction W of the lead plates 31 and 32 to seal the gap between the lead plates 31 and 32 to prevent the electrolyte solution filled within the pouch case 20 from leaking out through the gap between the lead plates 31 and 32.

A width w2 of the first sealant 34 needs to be determined to have a proper size in consideration of sealing of the secondary battery 100 and easy melting when the internal pressure increases, and should be formed to have a narrower width than the second sealant (35 in FIG. 2).

In this instance, the first sealant 34 may have at least one venting notch 34a to ensure excellent venting performance. The venting notch 34a has a pattern for releasing the sealing formed to a predetermined depth in a direction facing the metal bridge 33 from the electrode assembly 10 to allow the pressure in the secondary battery 100 to concentrate on to easily release the adhesion between the first sealant 34 and the lead plates 31 and 32.

The venting notch 34a may have various shapes such as a quadrangular shape (see FIG. 7), a round shape like a half circle (see FIG. 8), and a wedge shape (see FIG. 9).

In this instance, the width of the venting notch 34a preferably gradually reduces along a direction toward the metal bridge 33 to increase the pressure concentration effect. Particularly, when the venting notch 34a has a wedge shape with a pointed tip as shown in FIG. 9, the pressure concentration effect is maximized and the adhesion between the first sealant 34 and the lead plates 31 and 32 may be easily released.

Although FIG. 2 shows that the first sealant 34 is disposed further outside than the metal bridge 33 in the secondary battery 100, the present disclosure is not necessarily limited to this structure.

Figure 10:
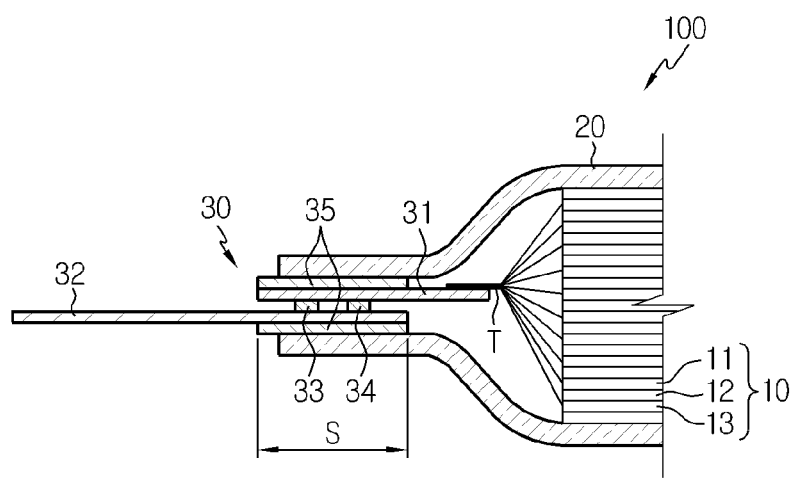
FIG. 10 is a cross-sectional view illustrating another shape of the secondary battery of FIG. 2.

That is, referring to FIG. 10, the first sealant 34 is illustrated as being disposed further inside (closer to the electrode assembly) than the metal bridge 33, and the secondary battery having this structure also allows quick overcurrent shut-off and fast discharge of generated gas.

As described above, because the secondary battery 100 according to an exemplary embodiment of the present disclosure includes the metal bridge 33 and the first sealant 34 interposed between the lead plates 31 and 32, the secondary battery 100 may shut off an overcurrent quickly as well as prevent the internal expansion pressure from excessively increasing.

That is, the secondary battery 100 is configured to have both the overcurrent shut-off function of the metal bridge 33 and the venting function of the first sealant 34, thereby ensuring the safety of the secondary battery in use.

While the present disclosure has been described in connection with a limited number of embodiments and drawings, the present disclosure is not limited thereto, and it should be understood that various changes and modifications may be made by those skilled in the art within the spirit and scope of the present disclosure and equivalents to the appended claims.

What is claimed is:

1. A secondary battery comprising:
an electrode assembly;
a first lead plate connected to the electrode assembly;
a second lead plate disposed facing the first lead plate with a gap therebetween such that at least a portion of the second lead plate overlaps with at least a portion of the first lead plate;
a metal bridge disposed within the gap to connect the first lead plate and the second lead plate;
a first sealant disposed within the gap, the entirety of the first sealant is separated from the metal bridge and positioned further away from the electrode assembly than the metal bridge is from the electrode assembly;
a pouch case to receive the electrode assembly such that the second lead plate is drawn outside; and
a second sealant interposed respectively between an inner surface of the pouch case and the first lead plate and between the inner surface of the pouch case and the second lead plate,
wherein the metal bridge is made of a metal having a lower melting point than the first lead plate and the second lead plate.

2. The secondary battery according to claim 1, wherein the metal bridge is continuously formed along an entire width of the first lead plate and the second lead plate.

3. The secondary battery according to claim 1, wherein the metal bridge is discontinuously formed along a widthwise direction of the first lead plate and the second lead plate.

4. The secondary battery according to claim 1, wherein the metal bridge has the melting point from 150° C. to 300° C.

5. The secondary battery according to claim 1, wherein the first sealant is continuously formed along a widthwise direction of the first lead plate and the second lead plate to seal the pouch case.

6. The secondary battery according to claim 5, wherein the first sealant has a narrower width than the second sealant.

7. The secondary battery according to claim 5, wherein the first sealant has a venting notch formed in a direction facing the metal bridge from the electrode assembly.

8. The secondary battery according to claim 7, wherein the venting notch has a gradual decrease in width along a direction facing the metal bridge.

9. The secondary battery according to claim 8, wherein the venting notch has a wedge shape.

10. An electrode lead assembly comprising:
a first lead plate;
a second lead plate disposed facing the first lead plate with a gap therebetween such that at least a portion of the second lead plate overlaps with at least a portion of the first lead plate;
a metal bridge disposed within the gap to connect the first lead plate and the second lead plate;
a first sealant disposed within the gap, the entirety of the first sealant is separated from the metal bridge and positioned further away from the electrode assembly than the metal bridge is from the electrode assembly; and
a second sealant attached to an outer surface of the first lead plate and an outer surface of the second lead plate,
wherein the metal bridge is made of a metal having a lower melting point than the first lead plate and the second lead plate.

11. The electrode lead assembly according to claim 10, wherein the metal bridge has the melting point from 150° C. to 300° C.

12. The electrode lead assembly according to claim 10, wherein the first sealant is continuously formed along a widthwise direction of the first lead plate and the second lead plate.

13. The electrode lead assembly according to claim 12, wherein the first sealant has a narrower width than the second sealant.

14. The electrode lead assembly according to claim 12, wherein the first sealant has a venting notch formed in a direction facing the metal bridge from the first sealant.

15. The electrode lead assembly according to claim 14, wherein the venting notch has a gradual decrease in width along a direction facing the metal bridge.

16. The electrode lead assembly according to claim 15, wherein the venting notch has a wedge shape.

17. A secondary battery comprising:
an electrode assembly;
a first lead plate connected to the electrode assembly;
a second lead plate disposed facing the first lead plate with a gap therebetween such that at least a portion of the second lead plate overlaps with at least a portion of the first lead plate;
a metal bridge disposed within the gap to connect the first lead plate and the second lead plate and continuously formed along an entire width of the first and second lead plates;
a first sealant disposed within the gap, the entirety of the first sealant is separated from the metal bridge and positioned further away from the electrode assembly than the metal bridge is from the electrode assembly;
a pouch case to receive the electrode assembly such that the second lead plate is drawn outside; and
a second sealant interposed respectively between an inner surface of the pouch case and the first lead plate and between the inner surface of the pouch case and the second lead plate.

* * * * *